3,033,867
BENZMORPHAN DERIVATIVES
Maxwell Gordon, Elkins Park, and Blaine M. Sutton, Philadelphia, Pa., assignors to Smith Kline & French Laboratories, Philadelphia, Pa., a corporation of Pennsylvania
No Drawing. Filed Dec. 22, 1960, Ser. No. 77,494
6 Claims. (Cl. 260—285)

This invention relates to novel benzmorphan derivatives which have been found to have unexpected analgetic properties. More specifically, the compounds of this invention are pyridine carboxylic acid esters of known benzmorphan analgetic compounds.

The ester derivatives have been found to have greater analgetic activity following oral administration coupled with a lower addiction liability and toxicity than the corresponding parent compounds. For instance, 2′-nicotinoyloxy - 5,9 - dimethyl-2-phenethyl-6,7-benzmorphan in the monkey addiction test carried out at the University of Michigan gave only a very slight suppression of morphine abstinence at 16 mg. to 84 mg./kg. doses subcutaneously while the parent compound, 2′-hydroxy-5,9-dimethyl-2-phenethyl-6,7-benzmorphan, gave complete suppression at 17 mg./kg. doses. This data indicates that the pyridinyl ester derivative unexpectedly has much lower addiction liability and toxicity than has the parent compound.

The compounds of this invention are more specifically represented by the following standard formula.

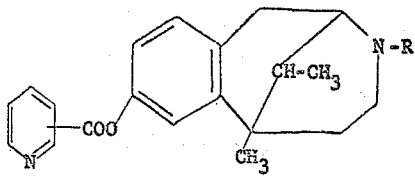

in which R represents lower alkyl having 1 to 5 carbon atoms, propargyl, allyl or an aralkyl having an alkylene chain of 2 to 4 carbon atoms and an aryl group selected from the group consisting of phenyl, thienyl, furyl, pyridinyl, methylthiophenyl, nitrophenyl, methoxyphenyl, aminophenyl and dimethylaminophenyl, the phenyl compounds preferably being substituted in the ortho or para positions.

Advantageous compounds are those having R representing phenethyl, p-aminophenethyl, thienylethyl, pyridinylethyl or furylethyl.

A particularly advantageous and preferred compound is 2′-nicotinoyloxy-5,9-dimethyl-2-phenethyl-6,7-benzmorphan.

The compounds of this invention are prepared by reacting the known parent compounds either as the base or acid addition salts with the desired pyridinecarboxylic halide usually in a tertiary basic solvent such as pyridine, lutidine, picoline, collidine, tributylamine etc. Alternatively the base can be reacted with the acid halide in an inert solvent such as benzene or ethyl acetate optionally in the presence of a tertiary base such as pyridine. If another reactive center is present in the parent compound such as an amino group the method of preparation would be obvious to one skilled in the art such as in this case by reducing the acylated nitro analogue.

The pyridinyl esters of this invention may be used as such or in the form of their nontoxic, pharmaceutically acceptable, acid addition salts. Such salts are prepared from suitable acids, such as inorganic acids, for instance, hydrochloric, hydrobromic, sulfuric or phosphoric, or organic acids, for instance, acetic, maleic or ethanedisulfonic. The acid addition salts are prepared by reacting the base with either one equivalent of acid or preferably an excess of acid in an organic solvent such as ether or an alcohol-ether mixture.

Also included in this invention are various isomers of the above noted structures, such as cis-trans isomers ("normal" and "iso" series respectively) at the 5,9 positions, the 2,9 positions, or individual optical isomers which might be separated by fractional crystallization of the diastereoisomeric salts formed for instance, with d- or l-tartaric acid or D-(+)-α-bromocamphor sulfonic acid. The important iso series of compounds is assumed to have the 9-methyl group in the trans or distal position related either to the 5-methyl group or the 2-N-substituent, however, the absolute configuration of these compounds is not readily apparent. Advantageously the esters are prepared by acylating the desired isomer of the parent phenolic compounds.

The following examples are representative of the methods of preparation and isolation of the alkyl and aralkyl-benzmorphan pyridinyl esters of this invention. It will be apparent that simple substituents can be present on the nucleus of the pyridinecarboxylic moiety such as methyl or halogen, or that other substituents can be present on the aryl moiety. Modifications of these procedures will be obvious to those skilled in the art and these examples are not to be construed as limiting the scope of this invention.

*Example 1*

A solution of 20 g. of 5,9-dimethyl-2′-hydroxy-2-phenethylbenzmorphan hydrobromide in 200 ml. of dry pyridine is stirred at room temperature while a mixture of 14.2 g. of nicotinoyl chloride and 15 ml. of pyridine is added. After standing overnight the mixture is cooled, diluted with petroleum ether and filtered to give the desired 2′ - nicotinoyloxy-5,9-dimethyl-2-phenethylbenzmorphan, M.P. 103–104° C. from hexane.

A portion of the base in hexane is reacted with an excess of maleic acid in isopropanol to give the monomaleate salt from ethanol, M.P. 176–177° C.

Repeating this reaction using iso-5,9-dimethyl-2′-hydroxy-2-phenethylbenzmorphan rather than the normal base gives the 2′-nicotinoyl ester of the iso compound.

*Example 2*

A mixture of 3.7 g. of 5,9-dimethyl-2-β-(4-nitrophenyl)-ethyl-2′-hydroxybenzmorphan, 2 g. of nicotinoyl chloride and 50 ml. of pyridine is allowed to stand at rom temperature overnight. The resulting solid is 2′-nicotinoyloxy-5,9-dimethyl-2-β-(4-nitrophenyl) - ethylbenzmorphan.

*Example 3*

A mixture of 1.6 g. of 5,9-dimethyl-2-α-thienylethyl-2′-hydroxybenzmorphan, 1 g. of nicotinoyl chloride and 25 ml. of collidine is allowed to stand overnight. Dilution with petroleum ether gives 5,9-dimethyl-2′-nicotinoyloxy-2-α-thienylethylbenzmorphan.

*Example 4*

A mixture of 3.2 g. of iso-5,9-dimethyl-2′-hydroxy-2-β-(2-pyridinyl)-ethyl-benzmorphan, 1.5 g. of nicotinoyl chloride and 40 ml. of methylethylpyridine is prepared and allowed to stand overnight. Working up as described above gives the desired nicotinoyl ester.

*Example 5*

A mixture of 0.8 g. of 5,9-dimethyl-2-β-(α-furyl)-ethyl-2′-hydroxybenzmorphan, .75 g. of isonicotinoyl chloride and 50 ml. of picoline is prepared and worked up as described above to give the desired 5,9-dimethyl-2-β-(α-furyl)-ethyl-2′-isonicotinoyloxybenzmorphan. This material (200 mg.) is reacted with ethanolic hydrochloric acid in hexane to give the hydrochloride salt.

Example 6

A mixture of 1.7 g. of 5,9-dimethyl-2-β-(2-methoxyphenyl)-ethyl-2′-hydroxybenzmorphan, 0.75 g. of picolinoyl chloride and 40 ml. of pyridine are mixed and reacted to give the picolinic ester.

Example 7

A mixture of 5 g. of 5,9-dimethyl-2′-hydroxy-2-phenethylbenzmorphan hydrobromide in 50 ml. of pyridine with 3.5 g. of isonicotinoyl chloride is reacted as in Example 1 to give the isonicotinic ester. Another portion (1 g.) is reacted with picolinoyl chloride to give the picolinic ester.

Example 8

A mixture of 0.8 g. of 5,9-dimethyl-2-α-(4-methylthiophenyl)-propyl-2′-hydroxybenzmorphan, prepared by acylating the base with 4-methylthiophenylpropyl bromide as in U.S. Pat. No. 2,924,603, 1 g. of picolinoyl chloride and 10 ml. of pyridine is reacted at room temperature overnight and worked up to give the picolinic ester. Substituting 5,9-dimethyl-2-β-(N-morpholinyl)-ethyl-2′-hydroxybenzmorphan for the starting material in Example 1 in the reaction with nicotinoyl chloride gives the desired 2′-nicotinic ester. Substituting 5,9-dimethyl-2-β-(4-dimethylaminophenyl)-ethyl-2′-hydroxybenzmorphan and isonicotinoyl chloride in Example 1 gives the 2′-isonicotinic ester. Substituting the β-thienyl for the α-thienyl isomer in Example 3 gives the corresponding ester derivative. Substituting 2′-hydroxy-2,5,9-trimethylbenzmorphan hydrobromide for the starting material in Example 1 gives the 2′-nicotinoyl ester thereof. Substituting 2′-hydroxy-2-amyl-5,9-dimethylbenzmorphan and isonicotinoyl chloride in equivalent amounts for the starting materials in Example 1 gives 2′-isonicotinoyloxy-2-amyl-5,9-dimethylbenzmorphan.

Example 9

A mixture of 21 g. of 5,9-dimethyl-2′-hydroxy-6,7-benzmorphan, 12.1 g. of allyl bromide, 16 g. of sodium bicarbonate and 350 ml. of ethanol is stirred under reflux for 19 hours. The cooled mixture is filtered and the filtrate concentrated to leave a gum which is extracted with boiling ether. The ether insoluble residue is recrystallized from hexane-ether to give 2-allyl-5,9-dimethyl-2′-hydroxy-6,7-benzmorphan, M.P. 131–132° C. This compound is dissolved in ethanolic hydrogen chloride and triturated with ether to give the hydrochloride salt.

A mixture of 1.2 g. of the allyl benzmorphan hydrochloride, 1 g. of nicotinoyl chloride and 50 ml. of dry pyridine is reacted overnight. After working up as in Example 1 the 2′-nicotinic ester is obtained.

Example 10

A mixture of 1 g. of 5,9-dimethyl-2-β-(4-nitrophenyl)-ethyl-2′-nicotinoyloxybenzmorphan, from Example 2, in 150 ml. of methanol with 500 mg. of 10% palladium-on-charcoal is shaken in hydrogen until the theoretical amount of hydrogen is absorbed. The filtrate is evaporated in vacuo then converted to the hydrochloride salt as described above to give 5,9-dimethyl-2-β-(4-aminophenyl)-ethyl-2′-nicotinoyloxybenzmorphan dihydrochloride.

Example 11

A mixture of 2.1 g. of 5,9-dimethyl-2′-hydroxy-6,7-benzmorphan, 0.8 g. of propargyl chloride, 1 g. of sodium carbonate in 75 ml. of ethanol is heated at reflux for 24 hours. Working the reaction up as in Example 9 gives 5,9-dimethyl-2′-hydroxy-2-propargyl-6,7-benzmorphan which (750 mg.) is reacted with 500 ml. of picolinoyl chloride in 10 ml. of dry pyridine to give the 2′-picolinoyl ester.

What is claimed is:

1. A chemical compound selected from the group consisting of a free base and its nontoxic, pharmaceutically acceptable, acid addition salts, said free base having the formula:

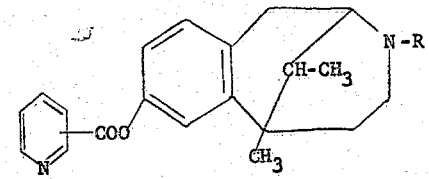

in which R is a member selected from the group consisting of alkyl having from 1 to 5 carbon atoms, propargyl, allyl and an aralkyl moiety, said aralkyl moiety having an alkyl portion having 2 to 4 carbon atoms and an aryl portion attached to said allkyl portion at an aryl carbon atom and selected from the group consisting of phenyl, thienyl, furyl, pyridinyl, methylthiophenyl, nitrophenyl, methoxyphenyl, aminophenyl and dimethylaminophenyl.

2. 2′-nicotinoyloxy-5,9-dimethyl-2-phenethyl-6,7-benzmorphan.

3. 2′-nicotinoyloxy-5,9-dimethyl-2-phenethyl-6,7-benzmorphan maleate.

4. Iso-2′-nicotinoyloxy-5,9-dimethyl-2-phenethyl-6,7-benzmorphan.

5. 2′-nicotinoyloxy-5,9-dimethyl-2-β-(4-aminophenyl)-ethyl-benzmorphan.

6. 2′-nicotinoyloxy-5,9-dimethyl-2-allylbenzmorphan.

References Cited in the file of this patent

UNITED STATES PATENTS

| | | |
|---|---|---|
| 2,878,253 | Zirm et al. | Mar. 17, 1959 |
| 2,924,603 | Gordon et al. | Feb. 9, 1960 |